Nov. 1, 1966  R. C. MALLONEE II, ET AL  3,282,555
FLOATING CONVOLUTE SEAL FOR BUTTERFLY VALVES
Filed Dec. 1, 1958
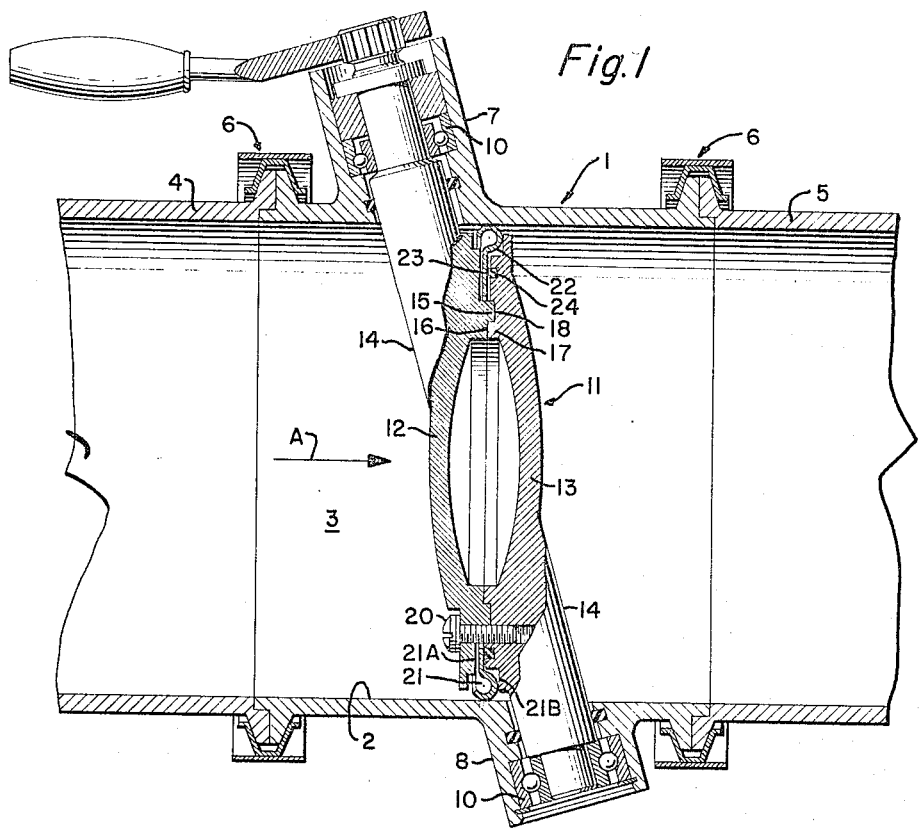
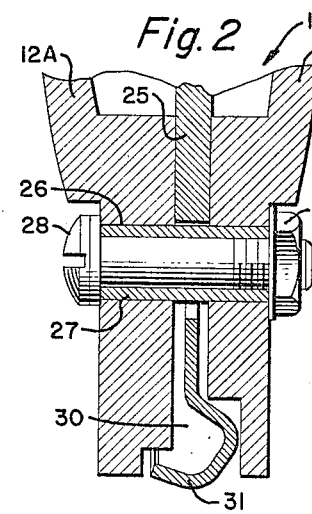
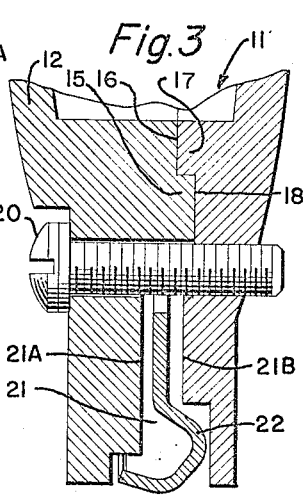
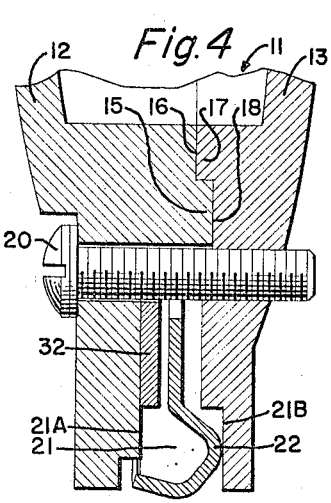
INVENTORS
RICHARD C. MALLONEE II
IRVIN D. BURKE
BY
Herschel C. Omohundro
ATTORNEY

United States Patent Office 3,282,555
Patented Nov. 1, 1966

3,282,555
FLOATING CONVOLUTE SEAL FOR
BUTTERFLY VALVES
Richard C. Mallonee II, and Irvin D. Burke, Phoenix, Ariz., assignors to The Garrett Corporation, Los Angeles, Calif., a corporation of California
Filed Dec. 1, 1958, Ser. No. 777,447
1 Claim. (Cl. 251—84)

This invention relates to valves and more particularly to valves embodying convoluted seals.

It is well known in the art that valves which are designed to control fluids possessing high temperatures must frequently employ parts which, due either to the particular geometry and location of the parts or to the inherent characteristics of the material from which the parts are formed, may be subject to discrepant deformations or physical responses to thermal change. These deformations or varied responses of cooperating valve and seat elements often result in leakage between the valve element and its seat, or, conversely, the valve element may be seized by surrounding structure, causing malfunction or failure of the valve.

It is, therefore, an object of the present invention to provide an improved valve which will maintain a more effective seal against the flow of fluids therethrough over a wide range of temperatures.

Another object of the present invention is to provide a seal member, in valves, which is self-centering and which will readily conform to the seat or surrounding structure with which sealing contact must be made.

A further object of the present invention is to provide a convoluted seal member for butterfly-type valves which allows unrestricted thermal expansion of the butterfly element and housing without impairing the operation of the valve.

Other objects and advantages of the invention will become more apparent to persons skilled in the art from reference to the following description and accompanying drawing, wherein:

FIGURE 1 represents an axial sectional view of one form of the present invention; and FIGS. 2, 3 and 4 represent enlarged fragmentary axial sectional views showing selected alternate forms of the invention.

Referring particularly to FIG. 1, it will be seen that the valve housing is generally indicated by the numeral 1. The housing 1 contains a bore 2 which defines a fluid passage 3. Conduits 4 and 5 are connected to opposite ends of the housing 1, by conventional clamps 6, and direct fluid under pressure to and from passage 3 in a direction indicated by the arrow A. A pair of obliquely directed, axially aligned bosses 7 and 8 are disposed at opposite sides of housing 1 and are formed to receive antifriction bearings 10. A divisible butterfly-type support element 11, comprising substantially circular divisions 12 and 13, is disposed in the passage 3, perpendicular to the axis thereof, being pivotally connected to the housing 1 by obliquely directed, axially aligned integral stems 14, the ends of which are journaled in bearings 10.

Division 12 of the butterfly 11 is provided with an annular land 15 and an annular groove 16, both of which correspond to a matching land 17 and a groove 18 formed in division 13. When the divisions 12 and 13 are joined by screws 20, the land 15 and groove 16 mesh with land 17 and groove 18 to form a lock which prevents relative lateral movement, uneven bending or misalignment between divisions 12 and 13 when said divisions are expanded unevenly or otherwise urged to shift due to external forces.

Another pair of annular grooves 21A and 21B are formed at the periphery of each of the divisions 12 and 13, and when these divisions are joined, as described above, a peripheral channel 21 is defined to receive an annular seal member 22, the periphery of which is convoluted. The inner circumference of the seal 22 is spaced from the bed of channel 21 to form a continuous circular gap therebetween, allowing relative lateral or edgewise movement between the seal 22 and its butterfly support 11 toward and away from the wall of the passage 3. Since the seal is somewhat independent of the butterfly 11 when the valve is closed, it is free, within obvious limits, to assume a position and shape dictated by the circumference of the bore 2 in the valve housing 1, irrespective of the eccentricity of the butterfly 11. It will be noted that an O-ring packing 23 is disposed in a ring-like recess 24 in one wall of the channel 21 for engagement with the seal 22 to form a fluid-tight closure between the seal 22 and the butterfly 11. The use of the O-ring 23 is often desirable where temperatures are not excessive and the relative movement between the seal 22 and the butterfly is not seriously impeded thereby.

FIGS. 2, 3 and 4 represent abstracted fragments of alternate constructions of the present invention which may be assumed to be disposed for pivotal movement in a housing constructed similar to that of housing 1 in FIG. 1.

FIG. 2 shows portions of a divisible butterfly 11A comprising divisions 12A and 13A which are accurately spaced by a concentrically positioned disc-shaped shim 25. The two divisions 12A and 13A contain openings 26 which receive cylindrical bushings 27, and the divisions 12A, 13A and shim 25 are joined by bolts 28 which traverse bushings 26 to receive nuts 29 at one end thereof. The bushings 27 are provided, in certain valves, as a locking means to resist relative lateral movement or misalignment of the divisions 12A and 13A when such valves are thermally expanded unevenly or when otherwise urged to shift. The diameter of the shim 25 is less than that of the butterfly 11A, and thus, since it separates divisions 12A and 13A, forms a peripherally disposed annular channel 30 between the divisions 12A and 13A. A convoluted annular seal 31 is so disposed in the channel 30 that the internal circumference of the seal 31 is spaced from the periphery of the shim 25 to form a continuous circular gap therebetween, allowing relative edgewise movement between the seal 31 and its butterfly support 11A. Since the seal 31 "floats" in the annular channel 30 and is relatively independent of its support, it is free, when the valve is closed, to assume a position and shape dictated by the circumference of the bore against which it is engaged, irrespective of the eccentricity of the butterfly 11A in the bore of the valve housing.

FIGS. 3 and 4 represent constructions which are basically identical with that shown in FIG. 1, except for the absence of the O-ring 23 in the devices represented in FIGS. 3 and 4, and the addition of an annular shim 32 for more accurately defining the width of the peripheral channel 21 in the device represented by FIG. 4. It will be understood, therefore, that like reference numerals are used to indicate like parts in FIGS. 1, 3 and 4.

Operation of the present device may be more fully understood by further reference to the device represented by FIG. 1, wherein fluid under pressure is admitted into the passage 3 through conduit 4, as indicated by the arrow A, and continuance or discontinuance of flow therethrough may be controlled in the conventional manner by pivoting the butterfly 11 on the axes of the stems 14 to open or close the passage 3.

If the valve is closed, as shown, the convoluted rim of the seal 22 will be wedged into fluid sealing contact with the circumference of the bore 2. Since, in the closed position, the seal is sustained by the bore 2 of the housing 1 and loosely disposed in the channel 21, it is substantially isolated from the effects of either bending or eccentric displacement of the butterfly 11 relative to the housing 1, whether said bending or displacement is due to unequal thermal responses of the butterfly 11 and housing 1 or to external forces which tend to deform either the butterfly 11 or the housing 1.

We claim:

A valve comprising: a housing formed to include a fluid passage; a butterfly element pivotally mounted in said housing, said element being formed of divisions; a shim disposed between the divisions of said butterfly element to form an annular channel at the periphery thereof; fastening means for joining said divisions; bushing means closely fitted in said butterfly element divisions and employed with said fastening means to form a lock to prevent relative movement between said divisions; and a continuous annular flexible convoluted seal member disposed and supported in said channel for lateral movement relative to said butterfly element toward and away from the wall of said passage, said butterfly and said seal cooperating to close said passage against the flow of fluid therethrough.

References Cited by the Examiner

UNITED STATES PATENTS

| | | | |
|---|---|---|---|
| 1,671,069 | 5/1928 | De Wein | 251—175 X |
| 1,858,587 | 5/1932 | Grant | 251—306 |
| 2,054,064 | 9/1936 | Anderson | 251—306 |
| 2,704,650 | 3/1955 | Rand | 251—333 X |
| 2,816,729 | 12/1957 | Jensen | 251—306 X |
| 2,886,283 | 5/1959 | Natho | 251—175 |
| 2,907,548 | 10/1959 | Maas et al. | 251—85 |
| 2,910,266 | 10/1959 | Condello | 251—305 X |
| 2,915,152 | 12/1959 | Graham | 189—36 |
| 2,934,312 | 4/1960 | Stevens | 251—283 |

FOREIGN PATENTS

| | | |
|---|---|---|
| 197,000 | 1923 | Great Britain. |
| 689,630 | 1953 | Great Britain. |
| 782,911 | 1957 | Great Britain. |

WILLIAM F. O'DEA, *Primary Examiner.*

ISADOR WEIL, *Examiner.*

R. GERARD, *Assistant Examiner.*